(12) United States Patent
Komoto (10) Patent No.: US 10,754,185 B2
(45) Date of Patent: Aug. 25, 2020

(54) VIEWING ANGLE EXPANSION FILM, POLARIZING PLATE, AND LIQUID CRYSTAL DISPLAY DEVICE

(71) Applicant: ZEON CORPORATION, Chiyoda-ku, Tokyo (JP)

(72) Inventor: Sogo Komoto, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/738,722

(22) PCT Filed: Jul. 6, 2016

(86) PCT No.: PCT/JP2016/069991
§ 371 (c)(1),
(2) Date: Dec. 21, 2017

(87) PCT Pub. No.: WO2017/010368
PCT Pub. Date: Jan. 19, 2017

(65) Prior Publication Data
US 2018/0173045 A1    Jun. 21, 2018

(30) Foreign Application Priority Data
Jul. 10, 2015  (JP) .................. 2015-139044

(51) Int. Cl.
*G02F 1/1335*  (2006.01)
*B32B 7/02*  (2019.01)
(Continued)

(52) U.S. Cl.
CPC ........ *G02F 1/133504* (2013.01); *B32B 3/266* (2013.01); *B32B 7/02* (2013.01);
(Continued)

(58) Field of Classification Search
CPC ......... G02F 1/133504; G02F 1/133528; G02F 1/1335; G02F 1/133606; G02F 1/0311;
(Continued)

(56) References Cited

U.S. PATENT DOCUMENTS 6,177,153 B1 * 1/2001 Uchiyama ............... B29C 55/04
156/244.11
6,239,911 B1  5/2001 Koike et al.
(Continued)

FOREIGN PATENT DOCUMENTS

CN    102597818 A    7/2012
CN    103080782 A    5/2013
(Continued)

OTHER PUBLICATIONS

English translation of JP 2014145985A, Title:Polarizing Diffusion Film, Method for Manufacturing Polarizing Diffusion Film, and Liquid Crystal Display Device Including Polarizing Diffusion Film, Date:Aug. 14, 2014 (Year: 2014).*
(Continued)

*Primary Examiner* — Shan Liu
(74) *Attorney, Agent, or Firm* — Kenja IP Law PC (57) ABSTRACT

The present invention provides a viewing angle expansion film which realizes visual recognition in wide viewing angle range, as well as a polarizing plate and a liquid crystal display device having the viewing angle expansion film. A viewing angle expansion film for expanding a viewing angle range including a plurality of hole-containing portions, which are approximately parallel to each other, on at least one surface of the viewing angle expansion film, wherein the hole-containing portion contains a hole, and is preferably constituted by crazes; as well as a polarizing plate and a liquid crystal display device having the viewing angle expansion film.

8 Claims, 3 Drawing Sheets

(51) Int. Cl.
*G02B 5/02* (2006.01)
*G02B 5/30* (2006.01)
*B32B 3/26* (2006.01)
*B32B 27/06* (2006.01)
*B32B 27/30* (2006.01)
*B32B 27/32* (2006.01)

(52) U.S. Cl.
CPC ............ *B32B 27/06* (2013.01); *B32B 27/306* (2013.01); *B32B 27/32* (2013.01); *G02B 5/02* (2013.01); *G02B 5/0247* (2013.01); *G02B 5/0268* (2013.01); *G02B 5/30* (2013.01); *G02F 1/1335* (2013.01); *G02F 1/133528* (2013.01); *B32B 2307/42* (2013.01); *B32B 2457/202* (2013.01)

(58) Field of Classification Search
CPC ............... G02F 1/116; G02F 1/133536; G02F 1/13362; G02F 1/133533; G02F 2001/133531; G02F 2001/133521; G02F 2001/13356; G02F 2001/133538; G02F 2001/133541; G02F 2001/133543; G02F 2001/133545; G02F 2001/133548; G02F 2001/13355; G02F 2001/133562; G02F 2001/133567; G02F 2203/16; G02B 5/0268; G02B 5/0247; G02B 5/30; G02B 5/02; G02B 5/0252; G02B 5/0257; G02B 6/0051; G02B 5/3033; G02B 6/0056; G02B 6/02109; B32B 27/306; B32B 27/32; B32B 3/266; B32B 27/06; B32B 7/02; B32B 2457/202; B32B 2307/42; B32B 17/10458; B29D 11/00644; H01L 51/5293; H01R 12/7005; H04B 10/532; G01J 5/0825; G03F 9/7065; G01R 33/3678; C09K 19/0208
USPC ................................. 349/64, 66, 122, 96–103
See application file for complete search history.

(56) References Cited

U.S. PATENT DOCUMENTS

| | | | |
|---|---|---|---|
| 6,424,395 B1 * | 7/2002 | Sato .................... | G02B 5/0236 349/112 |
| 6,916,440 B2 | 7/2005 | Jackson et al. | |
| 6,939,499 B2 | 9/2005 | Merrill et al. | |
| 7,229,271 B2 | 6/2007 | Merrill et al. | |
| 7,740,470 B2 | 6/2010 | Merrill et al. | |
| 9,144,935 B2 | 9/2015 | Maki et al. | |
| 9,314,961 B2 | 4/2016 | Merrill et al. | |
| 2007/0298193 A1 * | 12/2007 | Nakamura .......... | G02B 5/0242 428/1.33 |
| 2008/0094700 A1 | 4/2008 | Uehara | |
| 2008/0220214 A1 | 9/2008 | Uozu et al. | |
| 2010/0014164 A1 * | 1/2010 | O'Brien .................... | D04H 1/44 359/599 |
| 2010/0175820 A1 | 7/2010 | Uozu et al. | |
| 2012/0176573 A1 | 7/2012 | Kuze et al. | |
| 2012/0262646 A1 * | 10/2012 | Iwata ................ | G02F 1/133536 349/64 |
| 2014/0355125 A1 | 12/2014 | Boyd et al. | |
| 2015/0042934 A1 | 2/2015 | Kanno et al. | |
| 2015/0131038 A1 * | 5/2015 | Ishiguro ............ | G02F 1/133528 349/96 |
| 2015/0160507 A1 * | 6/2015 | Katsuta ............. | G02F 1/133504 349/61 |
| 2016/0229111 A1 | 8/2016 | Merrill et al. | |
| 2018/0348568 A1 * | 12/2018 | Yoshimi ............ | G02F 1/133634 |

FOREIGN PATENT DOCUMENTS

| | | | |
|---|---|---|---|
| JP | 06082607 A | * | 3/1994 |
| JP | H0682607 A | | 3/1994 |
| JP | H07146403 A | | 6/1995 |
| JP | H09166702 A | | 6/1997 |
| JP | H09281306 A | | 10/1997 |
| JP | 2006313262 A | | 11/2006 |
| JP | 2008090068 A | | 4/2008 |
| JP | 2009298100 A | | 12/2009 |
| JP | 2011033815 A | | 2/2011 |
| JP | 2012167159 A | | 9/2012 |
| JP | 2013008034 A | | 1/2013 |
| JP | 2013151162 A | | 8/2013 |
| JP | 2014145985 A | * | 8/2014 |
| JP | 2014145985 A | | 8/2014 |
| JP | 2015004857 A | | 1/2015 |
| JP | 2015505074 A | | 2/2015 |
| TW | 469357 B | | 12/2001 |
| WO | 2007046467 A1 | | 4/2007 |
| WO | 2009084661 A1 | | 7/2009 |
| WO | 2013096324 A1 | | 6/2013 |

OTHER PUBLICATIONS

English translation of JP-06082607-A, Title: Visual Field Selective Film and Its Production, Author: Miwa Minoru; Takeno Akiyoshi; Date of publication: Mar. 25, 1994 (Year: 1994).*

Oct. 11, 2016, International Search Report issued in the International Patent Application No. PCT/JP2016/069991.

Jan. 16, 2018, International Preliminary Report on Patentability issued in the International Patent Application No. PCT/JP2016/069991.

Jan. 23, 2019, the Extended European Search Report issued by the European Patent Office in the corresponding European Patent Application No. 16824348.3.

* cited by examiner

VIEWING ANGLE EXPANSION FILM, POLARIZING PLATE, AND LIQUID CRYSTAL DISPLAY DEVICE

FIELD

The present invention relates to a viewing angle expansion film, a polarizing plate, and a liquid crystal display device.

BACKGROUND

Liquid crystal display devices of TN mode and VA mode are devices that can be supplied at relatively low prices, since the technologies therefor have been established. Meanwhile, when those display devices are viewed from an oblique direction, tone reversal and reduction in brightness and contrast occur. Consequently, visual recognition of the liquid crystal display devices becomes difficult. Therefore, the TN mode liquid crystal display devices have been mainly adopted as display devices which are visually recognized from a predetermined angle, such as medium to small-sized television sets and personal computers. However, the liquid crystal display devices of these modes are recently attempted to be used also for devices which are required to have visual recognizability in wide viewing angle range, such as tablet type terminals, together with viewing angle expansion means.

A known example of the viewing angle expansion means is a phase difference layer which has a specific phase difference and provides compensation to a viewing angle with the specific phase difference. Various methods for producing such a phase difference layer have also been proposed (for example, Patent Literatures 1 and 2).

CITATION LIST

Patent Literature

Patent Literature 1: Japanese Patent Application Laid-Open No. 2013-151162 A
Patent Literature 2: International Publication No. 2009/084661

SUMMARY

Technical Problem

The present invention has been devised in view of the aforementioned problem. An object of the present invention is to provide a viewing angle expansion film, a polarizing plate, and a liquid crystal display device, which realize visual recognition in wide viewing angle range.

Solution to Problem

The present inventor intensively conducted studies for solving the aforementioned problem. As a result, the present inventor has found that the viewing angle range can be expanded when a TN mode and VA mode liquid crystal display devices are equipped with a film having on at least one surface a plurality of hole-containing portions being approximately parallel to each other. Thus, the present invention has been completed.

That is, the present invention is as follows.

(1) A viewing angle expansion film for expanding a viewing angle range, comprising:
a plurality of hole-containing portions, which are approximately parallel to each other, on at least one surface of the viewing angle expansion film, wherein the hole-containing portion contains a hole.

(2) The viewing angle expansion film according to (1), comprising two or more resin layers, wherein the hole-containing portions are provided on surfaces of one or more of the resin layers.

(3) The viewing angle expansion film according to (1) or (2), wherein intervals between the adjacent hole-containing portions are random intervals of 50 μm or less.

(4) The viewing angle expansion film according to any one of (1) to (3), containing an ultraviolet absorber.

(5) The viewing angle expansion film according to any one of (1) to (4), wherein the viewing angle expansion film is a polarizing plate protection film.

(6) The viewing angle expansion film according to any one of (1) to (5), wherein the hole-containing portions are constituted by crazes.

(7) A polarizing plate comprising: the viewing angle expansion film according to any one of (1) to (6); and a polarizer.

(8) The polarizing plate according to (7), wherein lengthwise directions of the hole-containing portions are parallel to or perpendicular to an absorption axis of the polarizer.

(9) The polarizing plate according to (7), wherein an angle formed between an absorption axis of the polarizer and lengthwise directions of the hole-containing portions is 45°.

(10) A TN mode liquid crystal display device comprising: the polarizing plate according to (7) or (9); and a TN mode liquid crystal cell, which are provided in this order from a visual recognition side, wherein
the polarizing plate is disposed such that a surface of the polarizing plate on a side of the viewing angle expansion film becomes a visual recognition side, and
an angle formed between an azimuth angle at which tone reversal occurs when a display screen is visually recognized from an oblique direction and lengthwise directions of the hole-containing portions is perpendicular.

(11) A VA mode liquid crystal display device comprising: the polarizing plate according to (7) or (8); and a VA mode liquid crystal cell, which are provided in this order from a visual recognition side, wherein
the polarizing plate is disposed such that a surface of the polarizing plate on the side of the viewing angle expansion film becomes a visual recognition side, and
lengthwise directions of the hole-containing portions are parallel to an absorption axis of the polarizer.

Advantageous Effects of Invention

When TN mode and VA mode liquid crystal display devices are equipped with the viewing angle expansion film according to the present invention, the viewing angle range thereof can be expanded.

Since the viewing angle range of the polarizing plate according to the present invention and the liquid crystal display device according to the present invention is expanded, they enable visual recognition in a wide viewing angle range.

DESCRIPTION OF EMBODIMENTS

Hereinafter, the present invention will be described in detail by illustrating embodiments and examples. However, the present invention is not limited to the embodiments and examples described below. The present invention may be freely modified for implementation without departing from the scope of claims of the present invention and its equivalent.

In the following description, the "polarizing plate" includes not only a rigid member, but also a flexible member such as a film made of a resin.

The direction of a constituent element being "45°", "parallel", "perpendicular" or "orthogonal" may include, unless otherwise stated, an error within the range that does not impair the effect of the present invention, for example, within the range of usually ±50, preferably ±20, and more preferably ±10.

The MD direction (machine direction) is a flow direction of a film in a production line, and usually coincides with a lengthwise direction and a longitudinal direction of a long-length film. Furthermore, the TD direction (traverse direction) is a direction that is parallel to a film surface and perpendicular to the MD direction, and usually coincides with a width direction and a crosswise direction of a long-length film.

[1. Viewing Angle Expansion Film]

The viewing angle expansion film according to the present invention is a viewing angle expansion film for expanding a viewing angle range of a liquid crystal display device.

[1.1. Material of Viewing Angle Expansion Film]

The material of the viewing angle expansion film according to the present invention may be a resin containing various polymers. Examples of such polymers may include polystyrene, polypropylene, polyethylene, polyester, polyamide, polyvinylidene fluoride, and an alicyclic structure-containing polymer. Among these, polystyrene, polypropylene, and an alicyclic structure-containing polymer are preferable from the viewpoint of facilitating formation of hole-containing portions.

Polystyrene is a polymer containing a repeating unit derived from a styrene-based monomer (hereinafter, appropriately referred to as a "styrene-based monomer unit"). The styrene-based monomer means to include styrene and a styrene derivative. Examples of the styrene derivative may include α-methylstyrene, o-methylstyrene, p-methylstyrene, p-chlorostyrene, p-nitrostyrene, p-aminostyrene, p-carboxystyrene, and p-phenylstyrene. As the styrene-based monomer, one type thereof may be solely used, and two or more types thereof may be used in combination at any ratio. Therefore, the styrene-based polymer may solely contain one type of styrene-based monomer unit. Alternatively, the styrene-based polymer may contain two or more types of styrene-based monomer units in combination at any ratio.

Polystyrene may be a homopolymer or a copolymer each containing only a styrene-based monomer(s). Alternatively, polystyrene may be a copolymer of a styrene-based monomer and another monomer. Examples of the monomer which is capable of being copolymerized with a styrene-based monomer may include ethylene, propylene, butadiene, isoprene, acrylonitrile, methacrylonitrile, α-chloroacrylonitrile, N-phenylmaleimide, methyl acrylate, methyl methacrylate, ethyl acrylate, ethyl methacrylate, maleic anhydride, acrylic acid, methacrylic acid, and vinyl acetate. As the monomer, one type thereof may be solely used, and two or more types thereof may be used in combination at any ratio.

Polypropylene may be a homopolymer of propylene. Alternatively, polypropylene may be a copolymer with a monomer other than propylene. When polypropylene is a copolymer, the polypropylene may be a random polymer, a block copolymer, or a graft polymer. However, even when polypropylene is a copolymer, the content rate of the repeating unit derived from propylene contained in polypropylene is preferably high, and specifically, preferably 80% by weight or more, and more preferably 85% by weight or more.

Examples of the alicyclic structure-containing polymer may include: (1) a norbornene-based polymer; (2) a monocyclic olefin-based polymer; (3) a cyclic conjugated diene-based polymer; (4) a vinyl alicyclic hydrocarbon-based polymer; and hydrides of (1) to (4). Among these, a norbornene-based polymer and a hydride thereof are preferable from the viewpoints of heat resistance, mechanical strength, and the like.

The weight-average molecular weight of the resin constituting the material for the viewing angle expansion film according to the present invention as a polystyrene equivalent weight-average molecular weight measured by gel permeation chromatography is usually 5,000 or more, preferably 10,000 or more, and more preferably 15,000 or more, and is usually 50,000 or less, preferably 45,000 or less, and more preferably 40,000 or less.

If necessary, the resin constituting the viewing angle expansion film according to the present invention may contain an optional component other than the polymer. Examples of the optional component may include an ultraviolet absorber, an antioxidant, a thermal stabilizer, a light stabilizer, an antistatic agent, a dispersant, a chlorine scavenger, a flame retardant, a nucleating agent for crystallization, a toughening agent, a blocking prevention agent, an antifogging agent, a mold release agent, a pigment, an organic or inorganic filler, a neutralizer, a lubricant, a decomposing agent, a metal deactivator, a fouling inhibitor, and an antimicrobial agent.

Examples of the ultraviolet absorber may include an oxybenzophenone-based compound, a benzotriazole-based compound, a salicylic acid ester-based compound, a benzophenone-based ultraviolet absorber, a benzotriazole-based ultraviolet absorber, an acrylonitrile-based ultraviolet absorber, a triazine-based compound, a nickel complex salt-based compound, and an inorganic powder. Examples of a suitable ultraviolet absorber may include 2,2'-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone, and 2,2',4,4'-tetrahydroxybenzophenone. Examples of a particularly suitable ultraviolet absorber may include 2,2'-methylenebis(4-(1,1,3,3-tetramethylbutyl)-6-(2H-benzotriazole-2-yl)phenol).

When the resin constituting the viewing angle expansion film contains an ultraviolet absorber, the content of the ultraviolet absorber per 100% by weight of the resin is preferably 0.5 to 5% by weight.

The viewing angle expansion film according to the present invention may include only one resin layer, or may include two or more resin layers. When the viewing angle expansion film according to the present invention has two or more resin layers, the aforementioned examples of the materials may be used as the material constituting each resin layer. When the viewing angle expansion film according to the present invention includes two or more resin layers, the hole-containing portions may be provided on a surface of one or more of the resin layers. In this case, the surface on which the hole-containing portions are provided may be the outermost surface of the viewing angle expansion film, or may be one or more interfaces between the plurality of resin layers inside the viewing angle expansion film. When the viewing angle expansion film according to the present invention includes two or more resin layers, the resin layers may be the same as or different from each other.

The viewing angle expansion film may include an optional layer. Examples of the optional layer may include an adhesion facilitating layer for enhancing adhesion between the viewing angle expansion film and another member. As the optional layer, one layer may be solely provided. Alternatively, any combination of two or more layers may be provided.

The thickness of the viewing angle expansion film is preferably 5 μm or more, more preferably 10 m or more, and further preferably 20 μm or more. The upper limit thereof is not particularly limited, and may be preferably 100 μm or less, more preferably 70 μm or less, and further preferably 40 μm or less. When the viewing angle expansion film includes two or more resin layers, the total thickness of the resin layers preferably falls within the aforementioned range.

[1.2. Hole-Containing Portions]

The viewing angle expansion film according to the present invention includes on at least one surface thereof a plurality of hole-containing portions being approximately parallel to each other, and the hole-containing portion contains a hole.

Figure 1:
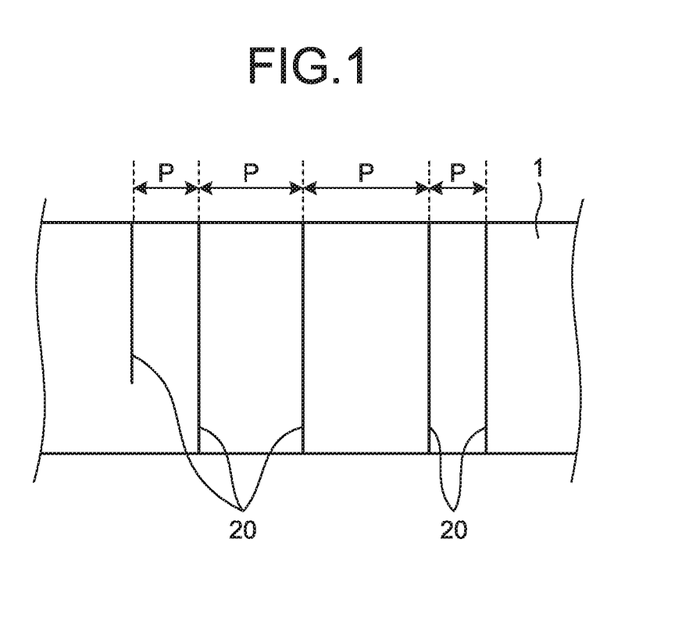
FIG. 1 is a plan view schematically illustrating an example of a viewing angle expansion film.

FIG. 1 is a plan view schematically illustrating an example of the viewing angle expansion film. In the example of FIG. 1, a long-length viewing angle expansion film 1 includes on the surface thereof a plurality of linear hole-containing portions 20 being parallel to each other. Each of the hole-containing portions 20 includes multiple holes (not shown in FIG. 1). In the example of FIG. 1, the lengthwise directions of the hole-containing portions 20 are parallel to the TD direction of the viewing angle expansion film 1.

Since the hole-containing portion contains holes, light having entered the hole-containing portion is scattered. Furthermore, since holes are contained, the refractive index of the hole-containing portion becomes lower than the refractive index of a portion of the film where the hole-containing portions are not formed. Accordingly, regions having different refractive indices exist in the plane of the viewing angle expansion film. As a result, the angle of the light scattering direction can be expanded. Although not to be bound by any specific theory, it is considered that expansion of the viewing angle range is achieved by such a wide range scattering.

The holes contained in the hole-containing portion may or may not penetrate the viewing angle expansion film in the thickness direction of the film. In either case, the hole-containing portion contains holes. Therefore, the hole-containing portion has a structure having a depth in the thickness direction of the film. Although each hole-containing portion usually has multiple holes, the structure of the hole-containing portion is not limited to this, and may include a single crack-shape hole.

The plurality of hole-containing portions is provided such that they are approximately parallel to each other. When the hole-containing portions are "approximately parallel" to each other, the angle formed by each other may be more than 00 within the range that the effects of the present invention are achieved.

Specifically, the angle may have an error of preferably within ±400, and more preferably within ±300. Since the hole-containing portions being "approximately parallel" to each other may have such an angle relationship, the plurality of hole-containing portions may have a site where they intersect each other on the viewing angle expansion film according to the present invention.

Each hole-containing portion usually has an approximately linear shape. The "approximately linear" shape of the hole-containing portion encompasses a case where the shape has a bend within the range that the effects of the present invention are achieved.

From the viewpoint of facilitating the formation of the hole-containing portions, the lengthwise directions of the hole-containing portions are preferably approximately parallel to the TD direction (approximately perpendicular to the MD direction) of the viewing angle expansion film. In this case, the hole-containing portion is not necessarily formed in a linear manner from one end to the other end opposing to the one end of the viewing angle expansion film 1 as illustrated in FIG. 1.

Intervals P of the adjacent hole-containing portions may be constant or random. For example, in the example illustrated in FIG. 1, the intervals P of the adjacent hole-containing portions 20 are not constant but random. From the viewpoint of obtaining a high viewing angle expansion effect, intervals between the hole-containing portions are preferably random.

The intervals P between the adjacent hole-containing portions are not particularly limited, but are preferably narrow intervals from the viewpoint of obtaining a favorable display screen quality and the like. Specifically, such intervals P may be preferably 50 μm or less, more preferably 40 μm or less, and further preferably 30 μm or less. When the intervals P are random, it is preferable that the largest value for the intervals P in the viewing angle expansion film is equal to or less than the aforementioned upper limit.

In a preferable aspect, some or all of the plurality of hole-containing portions contained in the viewing angle expansion film is constituted by crazes. From the viewpoint of facilitating the formation of the hole-containing portion, the hole-containing portion is preferably constituted by crazes.

Crazes mean cracks in approximately linear shape formed on a film. Crazes usually include fibrils formed between such cracks and voids as holes formed between the fibrils. Fibrils mean fibers obtained by fibrillization of molecules constituting a resin.

Figure 2:
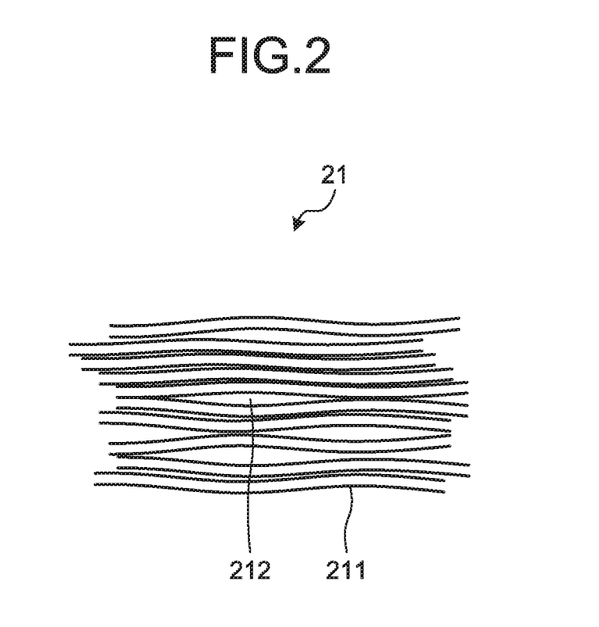
FIG. 2 is an enlarged schematic view illustrating an example of a structure of crazes.

FIG. 2 is an enlarged schematic view illustrating an example of a structure of crazes. In FIG. 2, crazes 21 include multiple elongated fibrils 211 and voids 212 existing between the fibrils 211. The fibrils 211 usually extend in a direction approximately orthogonal to the lengthwise direction of the crazes as the hole-containing portion. Crazes having such a structure may be formed by performing craze processing to a film. Fibrils and voids between the fibrils may be formed by subjecting a film to craze processing to apply a pressure to the film, to thereby form cracks on the film and fibrillizing molecules constituting the resin in spaces between the cracks. Details of the craze processing will be described later.

The diameter of the fibrils is usually 5 nm to 50 nm, preferably 10 nm to 50 nm, more preferably 10 nm to 40 nm, and further more preferably 20 nm to 40 nm. The diameter of the voids in the crazes is usually 5 nm to 45 nm, and preferably 10 nm to 30 nm. When the hole-containing portion is constituted by crazes, the width of such crazes is usually 30 nm to 1000 nm, preferably 100 nm to 1000 nm, more preferably 200 nm to 800 nm, and further more preferably 300 nm to 800 nm. The values for the diameter of the fibrils, the diameter of the voids, and the width of the crazes herein are average values, and may be specifically obtained by observing randomly selected three sites where crazes are developed using a scanning electron microscope, and measuring the sizes of fibrils and voids.

[1.3. Shape, Properties and Others of Viewing Angle Expansion Film]

The viewing angle expansion film according to the present invention may be a long-length film, or may be a sheet piece film. Usually, from the viewpoint of enhancing production efficiency, the viewing angle expansion film is produced as a long-length film. When producing a viewing angle expansion film in a sheet piece shape, a long-length viewing angle expansion film may be cut to a desired shape to produce a viewing angle expansion film in a sheet piece shape.

The viewing angle expansion film according to the present invention may be a substantially optically isotropic film with small optical anisotropy, or may be an optically anisotropic film.

When the viewing angle expansion film according to the present invention is an optically anisotropic film, an in-plane retardation Re thereof is preferably 360 nm or less, more preferably 330 nm or less, and further preferably 300 nm or less. The lower limit is not particularly limited, and may be preferably 10 nm or more, more preferably 20 nm or more, and further preferably 30 nm or more. A thickness direction retardation Rth thereof is preferably 400 nm or less, more preferably 350 nm or less, and further preferably 300 nm or less. The lower limit is not particularly limited, and may be preferably 10 nm or more, more preferably 20 nm or more, and further preferably 30 nm or more.

An in-plane retardation Re of the viewing angle expansion film is a value represented by $Re=(nx-ny)\times d$, unless otherwise stated. A thickness direction retardation Rth of the viewing angle expansion film is a value represented by $Rth=\{(nx+ny)/2-nz\}\times d$, unless otherwise stated. Herein nx represents a refractive index in a direction, among directions that are perpendicular to the thickness direction (an in-plane directions) of the viewing angle expansion film, that provides a maximum refractive index. ny represents a refractive index in a direction orthogonal to the direction of nx among the in-plane directions. nz represents a refractive index in the thickness direction. d represents a thickness of the viewing angle expansion film. The measurement wavelength is 590 nm, unless otherwise stated.

The total light transmittance of the viewing angle expansion film is preferably 70% or more, and more preferably 80% or more. The light transmittance may be measured in accordance with JIS K0115 using a spectrophotometer (ultraviolet visible near-infrared spectrophotometer "V-570" manufactured by Jasco Corporation).

[2. Method for Producing Viewing Angle Expansion Film]

The viewing angle expansion film according to the present invention may be produced by any method such as a known method. For example, the viewing angle expansion film according to the present invention may be produced by producing a film to be subjected to hole-containing portion formation, and thereafter forming the hole-containing portions on the surface of the produced film. As described herein, such a film to be subjected to hole-containing portion formation may be simply referred to as a "film".

[2.1. Production of Film]

Examples of a method for producing the film may include an injection molding method, an extrusion molding method, a press molding method, an inflation molding method, a blow molding method, a calendar molding method, a cast molding method, and a compression molding method.

The conditions such as a molten resin temperature when producing the film may be appropriately changed depending on the type of the film, and the film may be produced under publicly known conditions.

Examples of the method for producing the film in a case where the film includes two or more resin layers may include a coextrusion T-die method, a coextrusion inflation method, a coextrusion lamination method, dry lamination, a co-casting method, and a coating molding method.

The film may be an unstretched film which has not been stretched, or may be a stretched film which has been stretched. A stretched film is preferable. As the stretching method, any of uniaxial stretching and biaxial stretching may be adopted. A biaxial stretching is preferable. Among these, a suitable embodiment is biaxial stretching in which the stretching factor is higher in the TD direction of the film.

Stretching may be performed using a publicly known stretching apparatus. Examples of the stretching apparatus may include a lengthwise uniaxial stretching machine, a tenter stretching machine, a bubble stretching machine, and a roller stretching machine.

The stretching temperature is preferably (TG—30° C.) or higher, and more preferably (TG—10° C.) or higher, and is preferably (TG+60° C.) or lower, and more preferably (TG+50° C.) or lower. Here, "TG" represents the glass transition temperature of a resin.

The stretching factor is preferably 1.2 times to 5 times, more preferably 1.5 times to 4 times, and further preferably 2 times to 3 times. When stretching is performed in multiple different directions like biaxial stretching, it is preferable that a total stretching factor represented by a product of stretching factors in respective stretching directions falls within the aforementioned range.

[2.2. Formation of Hole-Containing Portions]

After the production of the film, the hole-containing portions may be formed on the surface of the film, to thereby produce the viewing angle expansion film.

Examples of a specific method for forming the hole-containing portions may include craze processing. By performing craze processing, the viewing angle expansion film having the hole-containing portions constituted by crazes can be efficiently produced.

The craze processing may be performed by any method such as a known method. Examples of the craze processing may include methods described in Japanese Patent Application Laid-Open No. Hei. 6-82607 A, Japanese Patent Application Laid-Open No. Hei. 7-146403 A, Japanese Patent Application Laid-Open No. Hei. 9-166702 A, Japanese Patent Application Laid-Open No. Hei. 9-281306 A, WO 2007/046467, Japanese Patent Application Laid-Open No. 2006-313262 A, Japanese Patent Application Laid-Open No. 2009-298100 A, and Japanese Patent Application Laid-Open No. 2012-167159 A.

Figure 3:
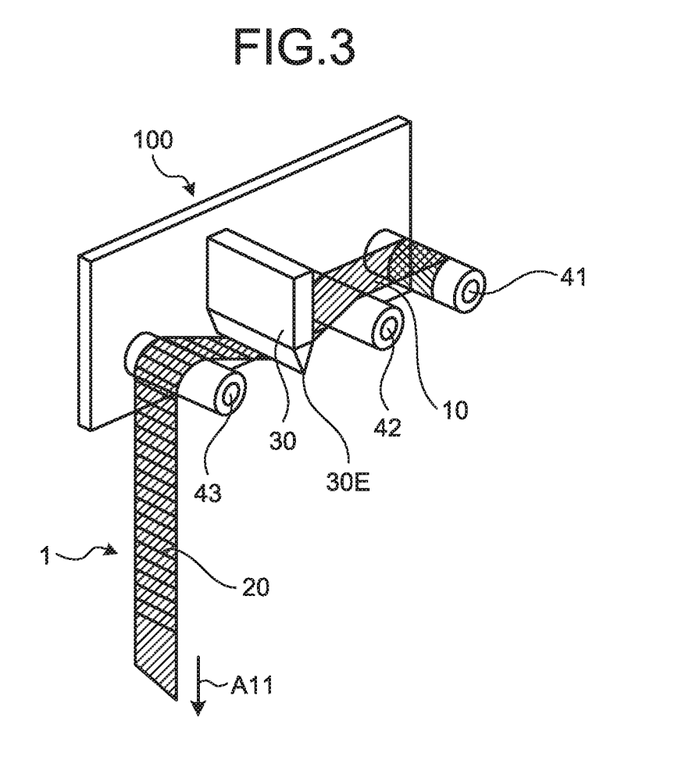
FIG. 3 is a perspective view schematically illustrating an example of a craze processing device.
Figure 4:
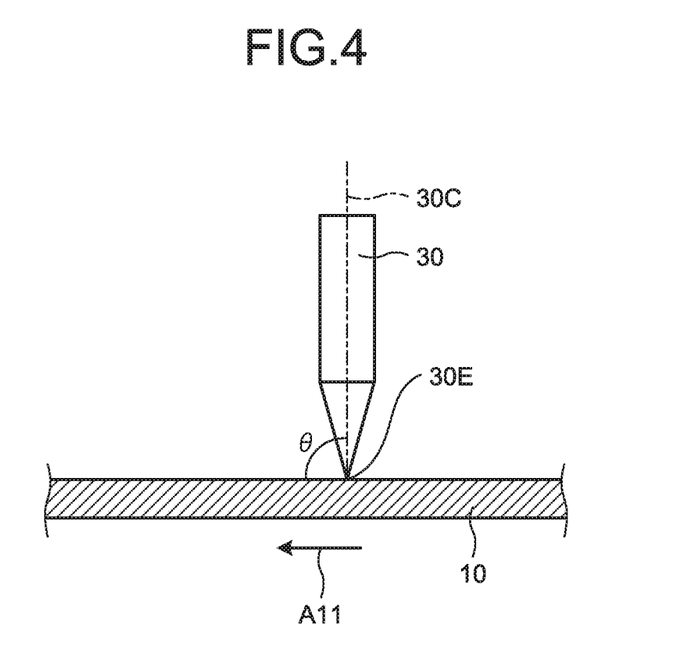
FIG. 4 is an enlarged side view schematically illustrating the vicinity of a blade of FIG. 3.

A specific example of the craze processing will be described with reference to FIG. 3 and FIG. 4. FIG. 3 is a perspective view schematically illustrating an example of a craze processing device, and FIG. 4 is an enlarged side view schematically illustrating the vicinity of the blade of FIG. 3. In FIG. 4, the device is observed from the TD direction.

In the example of FIG. 3, a craze processing device 100 includes a feed roll 41, conveyance rolls 42 and 43, and a blade 30. The blade 30 includes an edge 30E extending in a direction parallel to the TD direction.

In the operation of the craze processing device 100, a film 10 having been conveyed in the direction of arrow A11 from the feed roll 41 is conveyed by the conveyance rolls 42 and 43 while supported in a state of being pressed against the edge 30E of the blade 30. Accordingly, a pressure can be added to the film 10. As a result, the surface of the film 10 is deformed due to the added pressure, to thereby form the hole-containing portions 20 extending in a direction approximately parallel to the TD direction. Thus, the viewing angle expansion film 1 can be produced.

In the craze processing, an angle at which the blade 30 is in contact with the film 10 may be appropriately adjusted to an angle at which desired crazes are formed. In the example of FIG. 3 and FIG. 4, the angle is represented as an angle θ formed between a center line 30C of the blade 30 observed from the extending direction of the edge 30E and the downstream-side surface of the film 10. The angle θ is preferably 10° to 60°, more preferably 15° to 50°, and further preferably 20° to 40°.

The tension of the film when the blade is pressed against the film may be appropriately adjusted to a value with which desired crazes are formed. The tension is preferably 10 N/m to 300 N/m, and more preferably 50 N/m to 200 N/m.

The craze processing may be performed before a stretching process of the film, or may be performed simultaneously with a stretching process.

When a film including two or more resin layers is used as the film, and craze processing is performed to such a film, crazes may be developed in all of the two or more resin layers, or may be developed in only some of the resin layers. Furthermore, when crazes are developed in only some of the resin layers, crazes may be developed in the outermost surface layer, or may be developed in the inner layer. For example, when craze processing is performed to a film which includes an intermediate layer having relatively brittle material properties and surface layers having relatively flexible material properties which are on the front surface and the back surface of the intermediate layer, crazes may be developed in only the intermediate layer. Such a film may also be used as the viewing angle expansion film according to the present invention.

[3. Use of Viewing Angle Expansion Film: Polarizing Plate]

The viewing angle expansion film according to the present invention may be used for the applications of expanding the viewing angle range of a liquid crystal display device. However, the function of the viewing angle expansion film according to the present invention is not limited thereto. For example, the viewing angle expansion film according to the present invention may be a film exerting a function other than the function as a viewing angle expansion film, in addition to the function as a viewing angle expansion film. Examples of such a function other than the function as a viewing angle expansion film may include a function as a protective film, a function as a phase difference film, and a function as an optical compensation film. In particular, as will be described below, the viewing angle expansion film may be preferably used as a film which additionally exerts a function as a polarizing plate protection film in a polarizing plate.

The polarizing plate according to the present invention includes the viewing angle expansion film according to the present invention and a polarizer. In the polarizing plate according to the present invention, the viewing angle expansion film may also function as a polarizing plate protection film. Such a polarizing plate may be produced by, for example, bonding a polarizer and the viewing angle expansion film. In the polarizing plate according to the present invention, the polarizer and the viewing angle expansion film may be directly bonded without an adhesive layer therebetween, or may be bonded through an adhesive layer formed from an adhesive agent. Furthermore, another protective film may be disposed between the polarizer and the viewing angle expansion film.

When the viewing angle expansion film includes the hole-containing portions on only one surface thereof, such a surface may be located on the polarizer side, or may be located on a side opposite to the polarizer. As another example, when the viewing angle expansion film is a film which includes an intermediate layer and surface layers on the front surface and the back surface of the intermediate layer and contains the hole-containing portions on only one surface of the intermediate layer, the surface having the hole-containing portions of the intermediate layer may face to the polarizer side, or may face to the opposite side to the polarizer.

The polarizing plate according to the present invention may include the viewing angle expansion film on only one surface or both surfaces of the polarizer. When the polarizing plate includes the viewing angle expansion film on only one surface of the polarizer, the polarizer may include an optional film other than the viewing angle expansion film, wherein the optional film may function as a protective film on the other surface of the polarizer.

When the polarizing plate according to the present invention is used in a VA mode liquid crystal display device which will be described later, it is preferable that the lengthwise directions of the hole-containing portions are parallel to the absorption axis of the polarizer. With such a feature, the viewing angle range of the VA mode liquid crystal display device can be expanded.

When the polarizing plate according to the present invention is used in a TN mode liquid crystal display device which will be described later, it is preferable that the angle formed between the azimuth angle at which tone reversal occurs when a display screen of the liquid crystal display device is visually recognized from an oblique direction and the lengthwise directions of the hole-containing portions are perpendicular. With such a feature, the viewing angle range of the TN mode liquid crystal display device can be expanded.

The polarizer may be produced by, for example, subjecting a polyvinyl alcohol film to adsorption treatment with iodine or a dichroic dye, and thereafter uniaxially stretching the film in a boric acid bath. As another example, the polarizer may also be produced by subjecting a polyvinyl alcohol film to adsorption treatment with iodine or a dichroic dye, and further modifying some of polyvinyl alcohol units in the molecular chain into a polyvinylene unit. As still another example, a polarizer having a function of separating polarized light into reflected light and transmitted light, such as a grid polarizer, a multilayer polarizer, and a cholesteric liquid crystal polarizer, may also be used as the polarizer. Among these, a polarizer including polyvinyl alcohol is preferable. The polarization degree of the polarizer is preferably 98% or more, and more preferably 99% or more. The average thickness of the polarizer is preferably 5 µm to 80 µm.

As an adhesive agent for bonding the polarizer and the viewing angle expansion film, any optically transparent adhesive agent may be used. Examples of the adhesive agent may include an aqueous adhesive agent, a solvent-type adhesive agent, a two-component curable adhesive agent, an ultraviolet curable adhesive agent, and a pressure-sensitive adhesive agent. Among these, an aqueous adhesive agent is preferable, and a polyvinyl alcohol-based aqueous adhesive agent is particularly preferable. As the adhesive agent, one type thereof may be solely used, and two or more types thereof may be used in combination at any ratio.

The average thickness of the adhesion layer is preferably 0.05 µm or more, and more preferably 0.1 µm or more, and is preferably 5 µm or less, and more preferably 1 µm or less.

The method for bonding the viewing angle expansion film and the polarizer is not particularly limited, and example thereof may include a method wherein an adhesive agent is applied onto one surface of the polarizer as necessary, thereafter the polarizer and the viewing angle expansion film are bonded using a roll laminator, and then the bonded product is dried as necessary. The drying time and the drying temperature are appropriately selected depending on the type of the adhesive agent.

[4. Liquid Crystal Display Device]

The viewing angle expansion film according to the present invention and the polarizing plate according to the present invention may be used in a liquid crystal display device. A liquid crystal cell constituting the liquid crystal display device may be any publicly known liquid crystal cell of TN (Twisted Nematic) mode, VA (Virtical Alignment) mode, IPS (In-Plane Switching) mode, and the like. TN mode and VA mode are preferable from the viewpoint of allowing the viewing angle range to be effectively expanded.

[4.1. TN Mode Liquid Crystal Display Device]

The viewing angle expansion film according to the present invention or the polarizing plate according to the present invention is preferably used in a TN mode liquid crystal display device.

The TN mode liquid crystal display device according to the present invention includes the polarizing plate according to the present invention and a TN mode liquid crystal cell in this order from the visual recognition side. The polarizing plate is disposed such that the surface on the side of the viewing angle expansion film becomes the visual recognition side, and the angle formed between the azimuth angle at which tone reversal occurs when a display screen of a liquid crystal display device is visually recognized from an oblique direction, and the lengthwise directions of the hole-containing portions is perpendicular.

The TN mode liquid crystal display device usually includes a polarizing plate and a light source on a side of the TN mode liquid crystal cell that is opposite to the visual recognition side. As the polarizing plate disposed on the side that is opposite to the visual recognition side, the polarizing plate according to the present invention may be used. Alternatively, a polarizing plate other than the polarizing plate according to the present invention such as a publicly known polarizing plate may also be used. As the light source, any light source such as a publicly known light source may be used.

The visual recognition side refers to a side on which an observer of a displayed image is present when a liquid crystal display device is used.

When a liquid crystal display device is operated such that lightness gradually increases from black display to white display, the brightness of a display screen also comes to gradually increase. For example, when a liquid crystal display device is operated such that an 8-bit gray scale (black display is expressed by 0, white display 255, and halftones 0 to 255) is displayed on a display screen, the brightness of a display screen increases as the scale is increased from 0 to 255. However, the brightness of a display screen sometimes rather decreases as the lightness is gradually increased, depending on the direction from which the display screen is observed. For example, in the observation of Comparative Example 1 illustrated in FIG. 5, the brightness of a display screen decreases as the gray scale is operated to increase from around 130 to around 230. Such a phenomenon in which the operation of increasing or decreasing the lightness displayed on a display screen does not correspond to actual increase or decrease in brightness of the display screen is called "tone reversal". Tone reversal is sometimes observed at a certain azimuth angle when a display screen of a liquid crystal display device is visually recognized from an oblique direction. In the TN mode liquid crystal display device according to the present invention, the angle formed between the azimuth angle at which tone reversal occurs when a display screen is viewed from an oblique direction and the lengthwise directions of the hole-containing portions is perpendicular.

Consequently, such a tone reversal can be reduced, and the viewing angle range can be expanded.

The azimuth angle at which tone reversal occurs is not limited to one direction, and may be two directions, or an angle range which spreads to a certain degree. In such a case, a direction thereamong in which the viewing angle range is the most desired to be expanded may be determined, and the lengthwise directions of the hole-containing portions may be set in a direction perpendicular to the determined direction.

In the TN mode liquid crystal display device according to the present invention, the polarizing plate according to the present invention is preferably a polarizing plate in which the angle formed between the absorption axis of the polarizer and the lengthwise directions of the hole-containing portions is 45°. In an ordinary TN mode liquid crystal display device (having a rectangular display screen, and used in a state in which the display screen is upright in an approximately vertical direction with the long side direction of the rectangular being in a horizontal direction and the short side direction being in an approximately vertical direction), tone reversal is often observed when observed from the lower side. In a polarizer of an ordinary TN mode liquid crystal display device, the angle formed between the absorption axis of the polarizer and the horizontal direction of the display screen is often 45°. Therefore, when a polarizing plate in which the angle formed between the absorption axis of a polarizer and the lengthwise directions of the hole-containing portions is 45° is used as the polarizing plate of the present invention, such a polarizing plate facilitates disposal in which the angle formed between the absorption axis of a polarizer and the horizontal direction of a display screen becomes 45°, and the angle formed between the lengthwise directions of the hole-containing portions and the horizontal direction of a display screen becomes parallel. Therefore, the viewing angle range of the TN mode liquid crystal display device can be easily expanded.

[4.2. VA Mode Liquid Crystal Display Device]

The viewing angle expansion film according to the present invention or the polarizing plate according to the present invention is preferably used also in a VA mode liquid crystal display device.

The VA mode liquid crystal display device according to the present invention includes the polarizing plate according to the present invention and a VA mode liquid crystal cell in this order from the visual recognition side. The polarizing plate is disposed such that the surface on the side of the viewing angle expansion film becomes on the visual recognition side, and the lengthwise directions of the hole-containing portions are parallel to the absorption axis of a polarizer.

The VA mode liquid crystal display device usually includes a polarizing plate and a light source on a side of a VA mode liquid crystal cell that is opposite to the visual recognition side. As the polarizing plate disposed on a side that is opposite to the visual recognition side, the polarizing plate according to the present invention may be used. Alternatively, a polarizing plate other than the polarizing plate according to the present invention such as a publicly known polarizing plate may also be used. As the light source, any light source such as a publicly known light source may be used.

In the VA mode liquid crystal display device according to the present invention, the polarizing plate according to the present invention is preferably a polarizing plate in which the lengthwise directions of the hole-containing portions are parallel to or perpendicular to the absorption axis of a polarizer. In a case where such a polarizing plate is disposed in an ordinary liquid crystal display device, the relationship between the lengthwise directions of the hole-containing portions and the long side direction of a display screen is preferably parallel or perpendicular. With such a disposal, the viewing angle range of the VA mode liquid crystal display device can be expanded.

EXAMPLES

Hereinafter, the present invention will be specifically described by illustrating Examples. However, the present invention is not limited to Examples described below. The present invention may be freely modified for implementation without departing from the scope of claims of the present invention and its equivalent.

Unless otherwise stated, "%" and "parts" representing quantity in the following description are on the basis of weight. Unless otherwise stated, the operation described below was performed in a normal temperature and normal pressure in the atmospheric air.

Example 1

(1-1. Production of Viewing Angle Expansion Film)

Using a device schematically illustrated in FIG. 3 and FIG. 4, a viewing angle expansion film was produced.

A non-stretched polypropylene film having a width of 300 mm and a thickness of 15 μm (manufactured by Futamura Chemical, Co., Ltd.) and a biaxially stretched polypropylene film having a width of 300 mm and a thickness of 40 μm (manufactured by Futamura Chemical, Co., Ltd.) were bonded together by a thermal laminate method such that their lengthwise directions are aligned. Thus, a multilayer film 10 was obtained.

The film 10 was conveyed in the direction of arrow A11 at a speed of 50 mm/min and a film tension of 100 N/m. A Teflon (registered trademark) blade 30 was pressed against the surface on the side of the non-stretched polypropylene film of the film 10 being in conveyance, to perform craze processing. The direction of an edge 30E of the blade 30 during the craze processing was the width direction (TD direction) of the film. An angle θ formed between a center line 30C of the blade 30 observed from the extending direction of the edge 30E and the downstream-side surface of the film 10 was 30°. Thus, a viewing angle expansion film was produced.

In the obtained viewing angle expansion film, hole-containing portions were developed on the side of the biaxially stretched polypropylene film. The hole-containing portions were crazes in approximately linear shape, and the lengthwise directions of the hole-containing portions were approximately parallel to each other, and approximately parallel to the TD direction of the film. Intervals P between the hole-containing portions were random intervals of 30 μm or less. The average width of the hole-containing portions was 550 nm, the average depth of the holes was 15 μm, and the average diameter of the fibrils was 30 nm. These values were obtained by randomly selecting three sites on the craze film and observing a 25 μm-square area using a scanning electron microscope.

(1-2. Production of Liquid Crystal Display Device)

The viewing angle expansion film obtained in (1-1) was bonded to a polarizing plate on the visual recognition-side surface of a TN mode liquid crystal display device (ESP-RIMO FH99/CM manufactured by Fujitsu Limited). In bonding, the directions of the viewing angle expansion film and the TN mode liquid crystal display were adjusted such that the angle formed between the absorption axis of a polarizer in the visual recognition-side polarizing plate and the lengthwise directions of the hole-containing portions of the viewing angle expansion film became 450, and the lengthwise directions of the hole-containing portions became parallel to the long side direction of a rectangular display screen. The bonding of the viewing angle expansion film was performed such that its surface on which the hole-containing portions were formed became the visual recognition side. Thus, the liquid crystal display device containing the polarizing plate according to the present invention was obtained.

Example 2

(2-1. Production of Viewing Angle Expansion Film)

Using a device schematically illustrated in FIG. 3 and FIG. 4, a viewing angle expansion film was produced.

A non-stretched polypropylene film having a width of 300 mm and a thickness of 15 μm (manufactured by Futamura Chemical, Co., Ltd.) and a biaxially stretched polypropylene film having a width of 300 mm and a thickness of 40 μm (manufactured by Futamura Chemical, Co., Ltd.) were bonded together by a thermal laminate method such that their lengthwise directions are aligned. Thus, a multilayer film 10 was obtained.

The film 10 was conveyed in the direction of arrow A11 at a speed of 100 mm/min and a film tension of 50 N/m. A Teflon (registered trademark) blade 30 was pressed against the surface on the side of the non-stretched polypropylene film of the multilayer film 10 being in conveyance, to perform craze processing. The direction of an edge 30E of the blade 30 during the craze processing was the width direction (TD direction) of the film. An angle θ formed between a center line 30C of the blade 30 observed from the extending direction of the edge 30E and the downstream-side surface of the film 10 was 30°. Thus, a viewing angle expansion film was produced.

In the obtained viewing angle expansion film, hole-containing portions were developed on the side of the biaxially stretched polypropylene film. The hole-containing portions were crazes in approximately linear shape, and the lengthwise directions of the hole-containing portions were approximately parallel to each other, and approximately parallel to the TD direction of the film. Intervals P between the hole-containing portions were random intervals of 70 μm or less. The average width of the hole-containing portions was 500 nm, the average depth of the holes was 15 μm, and the average diameter of the fibrils was 25 nm. These values were obtained by randomly selecting three sites on the craze film and observing a 25 μm-square area using a scanning electron microscope.

(2-2. Production of Liquid Crystal Display Device)

A liquid crystal display device was produced by the same operation as (1-2) of Example 1, except that the viewing angle expansion film obtained in (2-1) was used in place of the viewing angle expansion film obtained in (1-1).

Example 3

(3-1. Production of Viewing Angle Expansion Film)

Using a device schematically illustrated in FIG. 3 and FIG. 4, a viewing angle expansion film was produced.

A biaxially stretched polypropylene film 10 having a width of 300 mm and a thickness of 40 μm (manufactured by Futamura Chemical, Co., Ltd.) was conveyed in the direction of arrow A11 at a speed of 100 mm/min and a film tension of 20 N/m. A Teflon (registered trademark) blade 30 was pressed against the film 10 being in conveyance to perform craze processing. The direction of an edge 30E of the blade 30 during the craze processing was the width direction (TD direction) of the film. An angle θ formed between a center line 30C of the blade 30 observed from the extending direction of the edge 30E and the downstream-side surface of the film 10 was 30°. Thus, a viewing angle expansion film was produced.

The hole-containing portions of the obtained viewing angle expansion film were crazes in approximately linear shape, and the lengthwise directions of the hole-containing portions were approximately parallel to each other, and approximately parallel to the TD direction of the film. Intervals P between the hole-containing portions were random interval of 70 μm or less. The average width of the hole-containing portions was 100 nm, the average depth of the holes was 15 μm, and the average diameter of the fibrils was 25 nm. These values were obtained by randomly selecting three sites on the craze film and observing a 25 μm-square area using a scanning electron microscope.

(3-2. Production of Liquid Crystal Display Device)

A liquid crystal display device was produced by the same operation as (1-2) of Example 1, except that the viewing angle expansion film obtained in (3-1) was used in place of the viewing angle expansion film obtained in (1-1).

Comparative Example 1

A TN mode liquid crystal display device (ESPRIMO FH99/CM manufactured by Fujitsu Limited) itself was subjected to evaluation.

[Evaluation]

(Evaluation of Visual Recognizability)

The liquid crystal display devices according to Examples 1 to 3 and Comparative Example 1 were visually inspected from a downside oblique direction, and evaluated for visual recognizability. The observation direction was a polar angle (an angle when the front observation direction is defined as 0°) of 60°. Evaluation was performed in accordance with the following criteria. Evaluation results are shown in Table 1.

Good: Images displayed on a liquid crystal screen can be visually recognized.

Poor: Images displayed on a liquid crystal screen cannot be visually recognized due to tone reversal.

(Evaluation of Tone Brightness Properties)

Using an LCD viewing angle properties measuring and evaluating device (ConoScope manufactured by Autronic-Melchers GmbH), a variety of gray scale display was performed for the liquid crystal display devices according to Example 1, Example 2, Example 3, and Comparative Example 1, and brightness values were obtained from the direction of a downside oblique polar angle of 60° under each gray scale condition. For each measured gray scale display, normalized brightness normalized in terms of brightness during white display was calculated according to the following formula 1 to obtain tone brightness properties. Results are shown in Table 1 and FIG. 5. As described herein, the gray scale is defined by 8 bits; black display is expressed by 0, white display by 255, and intermediate tones by values from 0 to 255.

$$\text{Normalized brightness} = \text{brightness of any gray scale display} / \text{brightness during white display} \quad \text{(formula 1)}$$

TABLE 1

|  | Ex. 1 | Ex. 2 | Ex. 3 | Comp. Ex. 1 |
| --- | --- | --- | --- | --- |
| Visual recognizability | Good | Good | Good | Poor |
| Tone brightness properties | No tone reversal | No tone reversal | Slight tone reversal | Tone reversal occurred |

As shown in Table 1, in Example 1, Example 2, and Example 3, visual recognizability when obliquely observed from the downside of the liquid crystal display device is favorable compared to that in Comparative Example 1, and therefrom it is understood that the viewing angle range is expanded.

Figure 5:
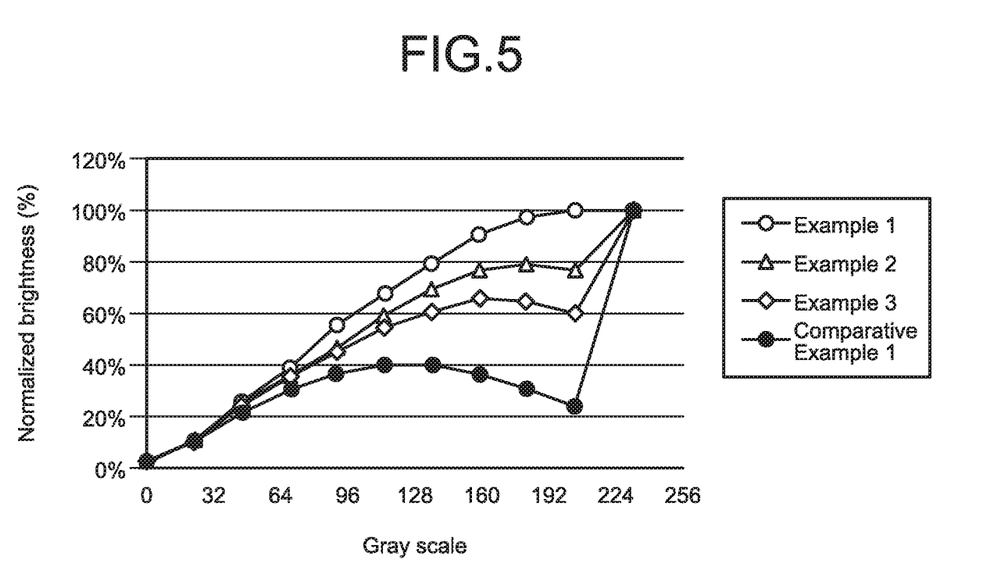
FIG. 5 is a graph showing tone brightness properties of Examples 1 to 3 and Comparative Example 1.

Regarding tone brightness properties, as shown in FIG. 5, the normalized brightness of Comparative Example 1 decreases from around 120 in the gray scale, demonstrating that tone reversal occurred. On the other hand, in Example 1 and Example 2, the relationship between the gray scale and the normalized brightness is approximately linear, demonstrating that tone reversal did not occur. In Example 3, the normalized brightness somewhat decreases from around 175 in the gray scale, demonstrating that tone reversal slightly occurred. It is understood that the viewing angle range is expanded in Example 1, Example 2, and Example 3, in comparison to that in Comparative Example 1.

REFERENCE SIGN LIST

1 viewing angle expansion film
10 film
20 hole-containing portion
21 craze (hole-containing portion)
211 fibril
212 hole
100 craze processing device
30 blade

The invention claimed is:

1. A TN mode liquid crystal display device comprising: a polarizing plate, and a TN mode liquid crystal cell, which are provided in this order from a visual recognition side, wherein
the polarizing plate includes a viewing angle expansion film for expanding a viewing angle range, and a polarizer,
the viewing angle expansion film includes a plurality of hole-containing portions, which are approximately parallel to each other, on at least one surface of the viewing angle expansion film, wherein the hole-containing portion contains a fibril and multiple holes,
the polarizing plate is disposed such that a surface of the polarizing plate on a side of the viewing angle expansion film becomes a visual recognition side,
the viewing angle expansion film is a product of forming the hole-containing portions on a surface of a biaxially stretched film,
an angle formed between an azimuth angle at which tone reversal occurs in a case that a display screen is visually recognized from an oblique direction and lengthwise directions of the hole-containing portions is perpendicular, and
an angle formed between an absorption axis of the polarizer and the lengthwise directions of the hole-containing portions is 45°.

2. The device according to claim 1, wherein the viewing angle expansion film comprises two or more resin layers, wherein the hole-containing portions are provided on surfaces of one or more of the resin layers.

3. The device according to claim 1, wherein intervals between the adjacent hole-containing portions are random intervals of 50 μm or less.

4. The device according to claim 1, wherein the viewing angle expansion film contains an ultraviolet absorber.

5. The device according to claim 1, wherein the viewing angle expansion film is a polarizing plate protection film.

6. The device according to claim 1, wherein the hole-containing portions are constituted by crazes.

7. The device according to claim 1, wherein a diameter of the fibril is 5 nm to 50 nm.

8. A TN mode liquid crystal display device comprising: a polarizing plate; and a TN mode liquid crystal cell, which are provided in this order from a visual recognition side, wherein
the polarizing plate includes a viewing angle expansion film for expanding a viewing angle range, and a polarizer,
the viewing angle expansion film includes a plurality of hole-containing portions which are approximately parallel to each other, on at least one surface of the viewing angle expansion film, wherein each of the hole-containing portions contains multiple holes, and the holes penetrate the viewing angle expansion film in the thickness direction of the film,
the polarizing plate is disposed such that a surface of the polarizing plate on a side of the viewing angle expansion film becomes a visual recognition side,
the viewing angle expansion film is a product of forming the hole-containing portions on a surface of a biaxially stretched film,
an angle formed between an azimuth angle at which tone reversal occurs in a case that a display screen is visually recognized from an oblique direction and lengthwise directions of the hole-containing portions is perpendicular, and
an angle formed between an absorption axis of the polarizer and the lengthwise directions of the hole-containing portions is 45°.

* * * * *